No. 883,000. PATENTED MAR. 24, 1908.
W. O. CUMMING.
COMBINED FURROW MAKER AND FERTILIZER DISTRIBUTER.
APPLICATION FILED DEC. 19, 1907.
2 SHEETS—SHEET 1.
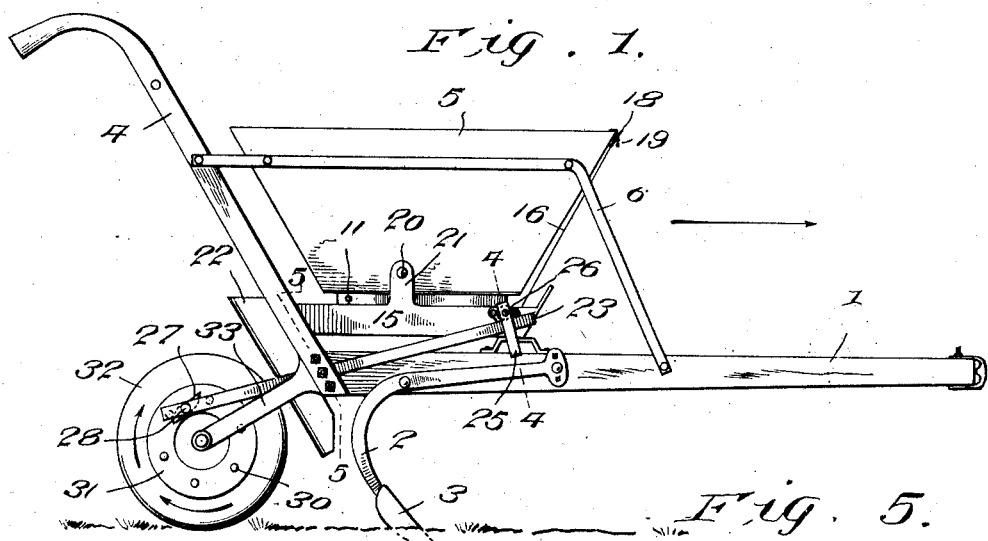
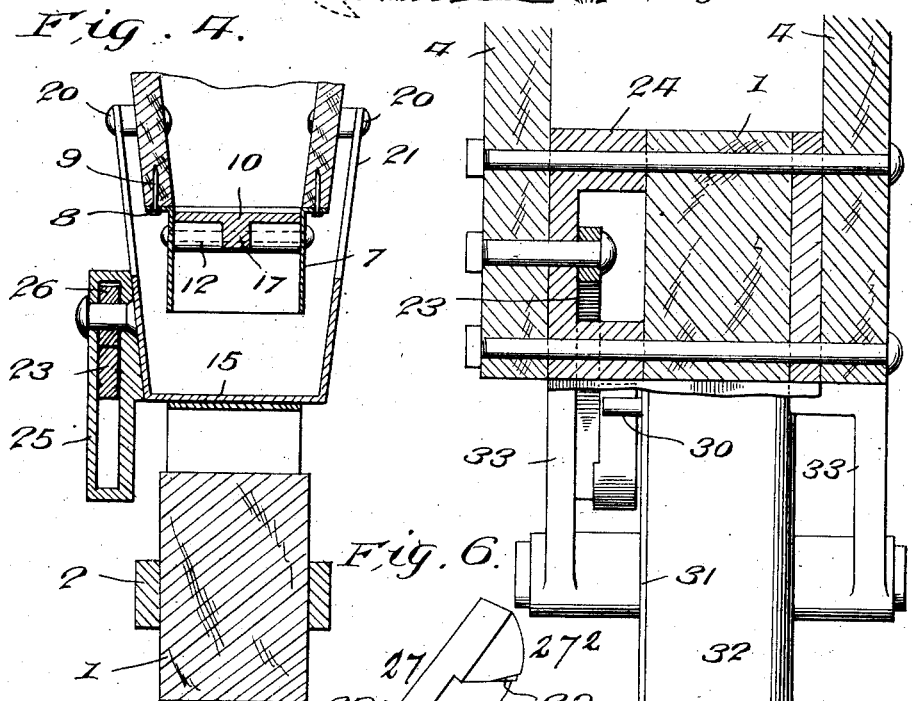
WITNESSES: INVENTOR
W. O. Cumming
BY
W. J. Fitzgerald
Attorneys No. 883,000. PATENTED MAR. 24, 1908.
W. O. CUMMING.
COMBINED FURROW MAKER AND FERTILIZER DISTRIBUTER.
APPLICATION FILED DEC. 19, 1907.

2 SHEETS—SHEET 2.

WITNESSES:

INVENTOR
W. O. Cumming
BY
W. F. FitzGerald & Co.
Attorneys

UNITED STATES PATENT OFFICE.

WILLIAM OTIS CUMMING, OF MACON, GEORGIA, ASSIGNOR TO R. C. HICKS AND J. W. HICKS, OF MACON, GEORGIA.

COMBINED FURROW-MAKER AND FERTILIZER-DISTRIBUTER.

No. 883,000.          Specification of Letters Patent.          Patented March 24, 1908.

Application filed December 19, 1907. Serial No. 407,170.

*To all whom it may concern:*

Be it known that I, WILLIAM OTIS CUMMING, a citizen of the United States, residing at Macon, in the county of Bibb and State of Georgia, have invented certain new and useful Improvements in a Combined Furrow-Maker and Fertilizer-Distributer; and I do hereby declare the following to be a full, clear, and exact description of the invention, such as will enable others skilled in the art to which it appertains to make and use the same.

My invention relates to new and useful improvements in a combined furrow maker and fertilizer distributer and my object is to provide means for distributing the fertilizer in the rear of the shovel employed for making the furrows.

A further object is to provide means for agitating parts of the distributer to cause the fertilizer to flow.

A still further object is to provide means for regulating the flow of the fertilizer.

A still further object is to provide means for operating the agitating device when the distributer is moved forwardly and a still further object is to provide means to regulate the stroke of the operating mechanism for the agitator.

Other objects and advantages will be hereinafter referred to and more particularly pointed out in the claims.

Figure 2:
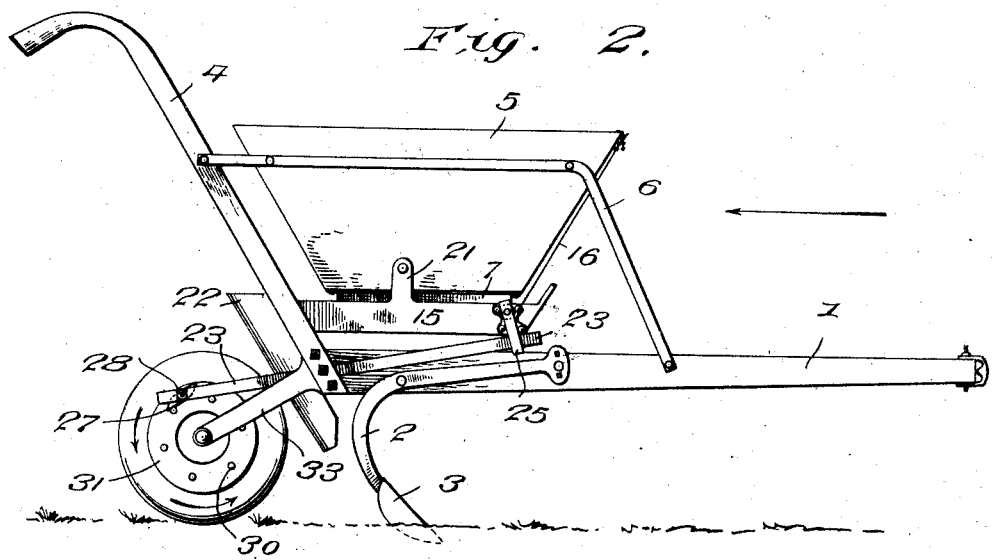
Figure 3:
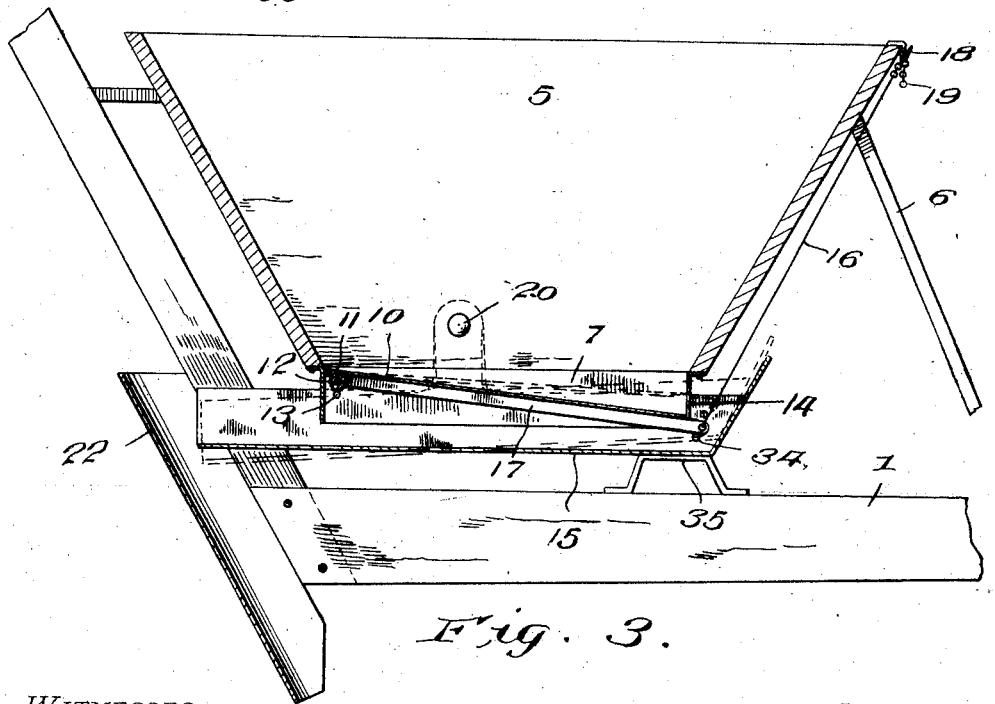

In the accompanying drawings which are made a part of this application, Figure 1 is a side elevation of my improved device complete, showing the position of the parts when the device is being moved forwardly. Fig. 2 is a similar view showing the position of the parts when the device is being moved rearwardly. Fig. 3 is a longitudinal, central, sectional view through the distributer. Fig. 4 is a sectional view on an enlarged scale, as seen on line 4—4, Fig. 1. Fig. 5 is a sectional view on an enlarged scale as seen on line 5—5, Fig. 1, and, Fig. 6 is a detail, perspective view of a trigger employed in connection with my improved device.

Referring to the drawings in which similar reference numerals designate corresponding parts throughout the several views, 1 indicates a beam, such as is commonly employed in connection with furrow making plows, to which is secured a shank or standard 2, the lower end of said shank or standard being provided with the usual form of furrow making shovel 3.

Extending upwardly and rearwardly from the rear end of the beam 1 are handles 4, in front of which is located a hopper 5, said hopper being supported above the beam 1 by means of straps 6, which are secured to the sides of the hopper and have their rear ends secured to the handles 4 and their forward ends to the beam 1, thereby forming a rigid support for the hopper. The walls of the hopper 5 are preferably constructed from wood and said walls converge towards their lower ends and have secured thereto a metallic frame 7, the upper edge of the frame having a flange 8 surrounding the same, which is adapted to fit against the lower edges of the walls of the hopper and be secured thereto in any preferred manner, as by entering nails, of the like 9, through openings in the flange and into the walls of the hopper.

Pivotally mounted between the walls of the frame 7 and adjacent the rear end of the frame, is a regulating board 10, said board being held in engagement with the frame 7 by introducing a pin 11 through a socket 12 at the rear end of the board and through registering openings 13 in the side walls of the frame and, by providing a plurality of said openings, the rear end of the board may be adjusted towards or from the upper edge of the frame.

The forward end wall of the frame 7 is removed to form a passage 14, through which the fertilizer from the hopper 5 may pass into an agitating pan 15 and, in order to regulate the amount of fertilizer passing through the passage thus provided, a cable 16 is secured to a rib 17 on the lower face of the regulating board 10 and extended into engagement with a hook 18 at the upper edge of the hopper, the upper end of the cable being provided with rings 19 adapted to engage the hook 18 and hold the forward end of the board 10 suspended and it will be readily seen that by raising or lowering the forward end of the board, the flow of the fertilizer through the passage 14 will be readily decreased or increased. The agitating pan 15 incloses the lower end of the frame 7 and extends beyond each end thereof, said pan being pivotally mounted to the hopper 5 by introducing bolts, or the like 20 through the walls of the hopper 5 and through ears 21 carried by the pan 15, said ears being located substantially at the longitudinal center of the agitating pan and, as the floor of the pan is some distance below the lower edge of the frame, said pan may readily swing on the bolts 20. The rear end of the pan 15 is open, so that the fertilizer may readily pass therefrom into a spout 22, said spout being secured to the rear end of the beam 1 and is so inclined as to deposit the fertilizer in the furrow made by the shovel 3 and immediately in the rear of the shovel. The pan 15 is agitated through the medium of a rocking bar 23, which bar is pivoted adjacent its longitudinal center to a casting 24, the forward end of the bar 23 extending through a loop 25 at the forward end of the agitating pan 15, the upper end of said loop having a friction roller 26 rotatably mounted therein, against which the end of the bar 23 is adapted to strike, said roller laterally reducing the friction, caused by the bar 23, engaging the same to a minimum. The opposite end of the bar 23 is provided with an adjustable trigger 27, which is preferably disposed at an angle to the longitudinal plane of the bar and is secured thereto by means of a bolt 28, the face of the trigger adjacent the bar 23, having shoulders 29, which are adapted to overhang the edges of the bar 23 and hold the trigger at various angles to the longitudinal plane of the bar.

The rear end 27' of the trigger 27 is curved downwardly and is adapted to extend in the path of pins 30 carried by a circular plate 31, said plate being in turn secured to a wheel 32, which wheel is rotatably mounted between arms 33 extending from the rear of the beam 1, one of said arms being a continuation of the casting 24, to which the rocking bar 23 is pivotally secured.

By arranging the trigger in this manner, the rear end of the bar 23 will be forced downwardly when the pins 30 engage the curved end of the trigger and towards the center of the wheel 32, while the opposite end of the bar will engage the friction roller 26 and swing the forward end of the agitating pan upwardly, thereby causing the fertilizer in the pan to move toward the rear or open end thereof and, as the forward end of the pan is elevated, a rod 34 extending across the interior of the pan 15, engages the extended end of the rib 17 and raises the forward end of the board 10, the impact of the rod 34 on the rib, causing the fertilizer resting on the end of the board to descend into the pan. The upward movement of the board 10 also agitates the fertilizer in the hopper and causes the same to readily descend and flow through the passage at the end of the frame 7 and, when the fertilizer is damp or closely adheres together, the swinging end of the board 10 is lowered through the medium of the adjusting cable 16, while, if the fertilizer is dry and flows freely, the swinging end of the board is elevated accordingly, thereby regulating the flow of the fertilizer through the passage.

The forward end of the trigger 27 is oppositely curved as at 27² to the rear end thereof, so that when the distributer is moved backward, the pins 30 will pass below the trigger 27 and lift the rear end of the bar 23, the forward end of the bar descending and, by providing the loop 25 of sufficient length to compensate for the stroke of the bar, the pan 15 will not be agitated when the distributer is moved rearwardly and, consequently, the fertilizer in said pan will not be caused to flow through the spout 22. The greatest weight in the agitating pan is at the forward end thereof and, in order to hold the pan horizontally when not being agitated by the bar 23, a stirrup 35 is secured to the beam 1 and in position to receive the forward end of the pan 15 when said forward end is in its lowered position, the greater weight in the forward end of the pan normally holding the same on the stirrup.

As best shown in Fig. 4 of the drawings, the walls of the frame 7 are vertical and of sufficient depth to permit the regulating board 10 to swing its full movement without passing below the lower edge of said walls and, as said board is of sufficient width to snugly fit between the side walls of the frame, the fertilizer is caused to flow through the passage 14 at the forward end of the frame and, as the regulating board is moved upwardly and downwardly on its pivot pin, the contents of the hopper will be agitated and caused to flow through the passage and likewise by retaining the weight of the fertilizer in the hopper on the board 10 and depositing the same into the agitating pan in small quantities, the swinging or agitating of said pan will cause the fertilizer to flow from the rear end thereof, regardless of the condition of the fertilizer.

In operation, the hopper 5 is filled with any suitable form of fertilizer and the forward end of the board 10 lowered in accordance with the condition of the fertilizer and, when the distributer is moved forwardly, the pins 30 will successively engage the trigger 27 and directing the forward end of the bar 23 into engagement with the friction roller 26 and, as the pins pass over the trigger, the pan 15 will be agitated or the forward end thereof elevated, causing the deposit of fertilizer in the pan to pass towards the rear end thereof.

When the distributer is moved backward for any reason, the pins 30 will pass below the trigger 27 and raise the rear end of the bar 23 instead of lowering the same and, as the forward end of the bar is loosely mounted in the loop 25, the lowering of the forward end of the bar will not effect the agitation of the pan 15 and no fertilizer will be distributed from the pan on the rearward movement of the distributer.

It will thus be seen that I have provided a very cheap and economical form of distributer and one that will be positive in its operation for all classes of fertilizer and it will further be seen that by causing the rear end of the rocking bar to descend or move towards the pivotal point of the wheel carrying the operating parts for the bar, the agitation of the pan will be more readily accomplished than if the bar were elevated. It will further be seen that by providing the regulating board, the flow of the contents of the hopper may be regulated and the weight of the contents of the hopper removed from the agitating pan and, while I have shown the adjusting mechanism for the regulating board, as consisting of a cable and the hook to hold the same, it will be readily understood that any form of regulating device may be employed.

What I claim is:

1. In a combined furrow maker and distributer, the combination with a beam; of a hopper, means to support said hopper above the beam, a regulating board at the lower end of said hopper, a pan pivotally secured to said hopper and below the regulating board and means to simultaneously agitate said pan and regulating board.

2. In a distributer of the class described, the combination with a beam; of a hopper supported above said beam, a frame at the lower end of said hopper having a passage at its forward end, a regulating board pivotally secured in said frame, means to adjustably support the free end of the regulating board, a pan pivoted to said hopper and extending below said frame and means to simultaneously agitate said pan and board, whereby the contents of the hopper will be directed into the pan and moved to the rear end thereof.

3. In a distributer of the class described, the combination with a beam; of a hopper fixed to said beam a frame at the lower end of the hopper, said frame having a passage at one end thereof, a regulating board, means to adjustably pivot one end of the regulating board in the closed end of the frame, adjusting means at the opposite end of the board, a pan pivotally secured to the hopper and extending below the same, a rod carried by the pan adapted to raise the free end of the regulating board and means to swing said pan, whereby the contents of the hopper will be fed into the pan and the contents of the pan moved to the rear end thereof.

4. In a distributer of the class described, the combination with a beam, a hopper carried by the beam, a pan pivotally mounted on said hopper and below the lower end thereof and means to feed the contents of the hopper into the pan; of a rocking bar, means to pivotally mount the rocking bar on the beam, a friction roller on said pan adapted to be engaged by the forward end of the rocking bar, a trigger on the opposite end of said bar and means to engage said trigger and lower the same and direct the opposite end of the bar into engagement with the friction roller and tilt the pan, when the distributer is moved forwardly.

5. In a distributer of the class described, the combination with a hopper, a pan pivotally secured at the lower end of said hopper and means to support the contents of the hopper and gradually feed the same into said pan; of a rocking bar pivoted to said beam, a loop to loosely receive the forward end of the rocking bar, a trigger at the opposite end of said bar, means to adjust the angle of the trigger with respect to said bar, a wheel carried by said beam and means on the wheel adapted to engage and lower said trigger and elevate the forward end of the bar, whereby the pan will be rocked and the contents thereof moved to the rear end of the pan.

6. In a distributer of the class described, the combination with a hopper, means to support the hopper and a pan pivotally secured to the lower end of the hopper; of a pivotally mounted bar, means to loosely attach one end of the bar to the forward end of the pan, a trigger secured to the opposite end of the bar and adapted to be adjusted thereon, a wheel, pins carried by said wheel adapted to engage said trigger and move the same downwardly when the distributer is moved forwardly and elevate the same when the distributer is moved rearwardly.

7. In a distributer of the class described, the combination with a pivotally mounted bar, a trigger having its ends oppositely curved, means to secure the trigger to one end of the pivoted bar; of a wheel and a plurality of pins carried by said wheel adapted to engage and pass over said trigger and raise the forward end of said bar when the wheel is moved forwardly and engage and pass below the trigger and lower the forward end of the bar when the wheel is moved rearwardly.

8. A distributer of the class described, comprising the combination with a hopper, a pan pivoted to said hopper and a pivotally mounted bar adapted to rock said pan; of a trigger, a plurality of shoulders on one face of said trigger, adapted to engage the edges of the bar and adjust the pitch of the trigger and means to rock said bar, whereby the pan will be agitated.

9. In a distributer of the class described, the combination with a hopper, a regulating board pivotally secured to the lower end of the hopper, a pan pivotally secured to the hopper and extending below the regulating board, means carried by the pan adapted to raise said board, a rocking bar, one end of which is adapted to loosely engage the forward end of said pan, a trigger secured to the opposite end of the bar and adapted to be adjusted thereon, pins adapted to engage said trigger and agitate the pan and rotatable means adapted to carry said pins, whereby they will be successively brought into engagement with the trigger.

10. In a distributer of the class described, the combination with a hopper; of a regulating board pivotally secured to the lower end of the hopper, an agitating pan below said board and means to limit the downward movment of the forward end of said pan and hold the same in a horizontal position.

In testimony whereof I have signed my name to this specification in the presence of two subscribing witnesses.

WILLIAM OTIS CUMMING.

Witnesses:
E. B. WEATHERBY,
J. F. MINTON.